(12) United States Patent
Corwin

(10) Patent No.: US 12,442,699 B1
(45) Date of Patent: Oct. 14, 2025

(54) SYSTEMS AND METHODS FOR DETERMINING FORCE EXERTED BY AND/OR WEIGHT OF AN OBJECT

(71) Applicant: Richard L. Corwin, Bay City, TX (US)

(72) Inventor: Richard L. Corwin, Bay City, TX (US)

( * ) Notice: Subject to any disclaimer, the term of this patent is extended or adjusted under 35 U.S.C. 154(b) by 0 days.

(21) Appl. No.: 18/783,443

(22) Filed: Jul. 25, 2024

Related U.S. Application Data

(60) Provisional application No. 63/528,723, filed on Jul. 25, 2023.

(51) Int. Cl.
*G01L 1/24* (2006.01)
*G06T 7/62* (2017.01)

(52) U.S. Cl.
CPC . *G01L 1/24* (2013.01); *G06T 7/62* (2017.01)

(58) Field of Classification Search
CPC .................................. G01L 1/24; G06T 7/62
See application file for complete search history.

(56) References Cited

U.S. PATENT DOCUMENTS

| | | | |
|---|---|---|---|
| 6,321,605 B1 | 11/2001 | Gagnon | |
| 6,606,540 B1 | 8/2003 | Gross | |
| 8,411,140 B2* | 4/2013 | Adelson | G01L 1/24 |
| | | | 348/135 |
| 9,757,682 B2 | 9/2017 | Endo et al. | |
| 10,026,187 B2 | 7/2018 | McCloskey et al. | |
| 10,060,810 B2 | 8/2018 | Lee et al. | |
| 10,274,386 B2* | 4/2019 | Shafer | B25J 13/085 |
| 11,150,152 B2* | 10/2021 | Shafer | G01D 5/30 |
| 11,628,576 B2 | 4/2023 | Alspach et al. | |
| 12,025,525 B2* | 7/2024 | Elias | B25J 13/084 |
| 2014/0104395 A1* | 4/2014 | Rohaly | G01B 11/245 |
| | | | 348/47 |
| 2018/0325454 A1* | 11/2018 | Petelenz | A61F 2/76 |
| 2019/0091872 A1* | 3/2019 | Alspach | B25J 13/085 |
| 2019/0234819 A1* | 8/2019 | Shafer | G01L 3/08 |
| 2023/0266120 A1* | 8/2023 | Rohaly | G01B 11/24 |
| | | | 356/600 |

FOREIGN PATENT DOCUMENTS

| | | |
|---|---|---|
| KR | 102512972 B1 | 3/2023 |
| WO | WO2011/157261 A2 | 4/2012 |

* cited by examiner

*Primary Examiner* — Freddie Kirkland, III
(74) *Attorney, Agent, or Firm* — Quisenberry Law PLLC; C. Dale Quisenberry

(57) ABSTRACT

Various embodiments of a sensors and related methods for measuring force are disclosed. A system for measuring force may include a sensor including a flexible sheet of material, a rigid clear plate, and a fluid filled bladder, the flexible sheet of material being affixed to the rigid clear plate, and the fluid filled bladder being disposed between the flexible sheet of material and the rigid clear plate. The system may also include a camera disposed beneath the rigid clear plate and including a camera lens aimed upwardly toward the rigid clear plate. The system may also include a computer connected to the camera. Various other details are provided.

20 Claims, 12 Drawing Sheets

SYSTEMS AND METHODS FOR DETERMINING FORCE EXERTED BY AND/OR WEIGHT OF AN OBJECT

RELATED APPLICATIONS

This application claims the benefit of U.S. Provisional Application No. 63/528,723, filed Jul. 25, 2023, the contents of which are fully incorporated herein by reference.

BACKGROUND OF THE INVENTIONS

1. Field of the Inventions

The present inventions generally pertain to sensors and related systems and methods, and more particularly to systems and methods for determining the force exerted by an object or the weight of an object.

2. Description of the Related Art

Various devices and systems are known for measuring the weight of an object, such as a bathroom scale for example. Similarly various devices and systems are known for determining the force exerted by an object, such as a load cell for example. As will become apparent from the description and explanation set forth below, the present inventions provide improvements in the technology of weight and force measurement and related technologies.

SUMMARY OF THE INVENTIONS

In one aspect, the present inventions relate to sensors that may be used to determine the weight of an object. In a broad aspect, the present sensor inventions are based on a simple observation: as a bladder is pressed down, its equator expands; and as it is pressed laterally, the bladder stretches. In a broad aspect, the present sensor inventions measure the change in the shape of the bladder to determine the force acting on the bladder.

In another aspect, the present inventions may include a system for measuring force comprising: a sensor including a flexible sheet of material, a rigid clear plate, and a fluid filled bladder, the flexible sheet of material being affixed to the rigid clear plate, and the fluid filled bladder being disposed between the flexible sheet of material and the rigid clear plate; and a camera disposed beneath the rigid clear plate and including a camera lens aimed upwardly toward the rigid clear plate. Another feature of this aspect of the present inventions may be that the system may include a computer connected to the camera. Another feature of this aspect of the present inventions may be that the flexible sheet of material is a latex sheet. Another feature of this aspect of the present inventions may be that the rigid clear plate is a sheet of glass. Another feature of this aspect of the present inventions may be that the rigid clear plate is a sheet of plexiglass. Another feature of this aspect of the present inventions may be that the bladder is an elastic spheroid. Another feature of this aspect of the present inventions may be that the fluid in the bladder is a non-compressible liquid. Another feature of this aspect of the present inventions may be that the fluid in the bladder is air. Another feature of this aspect of the present inventions may be that a space between the flexible sheet of material, the rigid clear plate, and surrounding the bladder is filled with a fluid. Another feature of this aspect of the present inventions may be that the sheet and the bladder are constructed from materials having contrasting colors.

In another aspect, the present inventions may include a system for measuring force comprising: a sensor including a flexible sheet of material, a rigid clear plate, and a fluid filled bladder, the flexible sheet of material being affixed to the rigid clear plate, and the fluid filled bladder being disposed between the flexible sheet of material and the rigid clear plate, the sheet and the bladder being constructed from materials having contrasting colors, and the fluid in the bladder being one of a non-compressible liquid and air; and a camera disposed beneath the rigid clear plate and including a camera lens aimed upwardly toward the rigid clear plate. Another feature of this aspect of the present inventions may be that the system may include a computer connected to the camera. Another feature of this aspect of the present inventions may be that the flexible sheet of material is a latex sheet. Another feature of this aspect of the present inventions may be that the rigid clear plate is a sheet of glass. Another feature of this aspect of the present inventions may be that the rigid clear plate is a sheet of plexiglass. Another feature of this aspect of the present inventions may be that the bladder is an elastic spheroid.

In still another aspect, the present inventions may be a system for measuring force comprising: a sensor including a flexible sheet of material, a rigid clear plate, and a fluid filled bladder, the flexible sheet of material being affixed to the rigid clear plate, and the fluid filled bladder being disposed between the flexible sheet of material and the rigid clear plate; a camera disposed beneath the rigid clear plate and including a camera lens aimed upwardly toward the rigid clear plate; and a computer connected to the camera. Another feature of this aspect of the present inventions may be that the fluid in the bladder is one of a non-compressible liquid and air. Another feature of this aspect of the present inventions may be that a space between the flexible sheet of material, the rigid clear plate, and surrounding the bladder is filled with a fluid. Another feature of this aspect of the present inventions may be that the sheet and the bladder are constructed from materials having contrasting colors.

Other features, aspects and advantages of the present inventions will become apparent from the following discussion and detailed description.

BRIEF DESCRIPTION OF THE DRAWINGS

FIG. 5 is half of the embodiment, which is symmetrical on the cross-section.

While the inventions will be described in connection with the preferred embodiments, it will be understood that the scope of protection is not intended to limit the inventions to those embodiments. On the contrary, the scope of protection is intended to cover all alternatives, modifications, and equivalents as may be included within the spirit and scope of the inventions as defined by the appended claims.

DETAILED DESCRIPTION OF THE INVENTIONS

Figure 1:
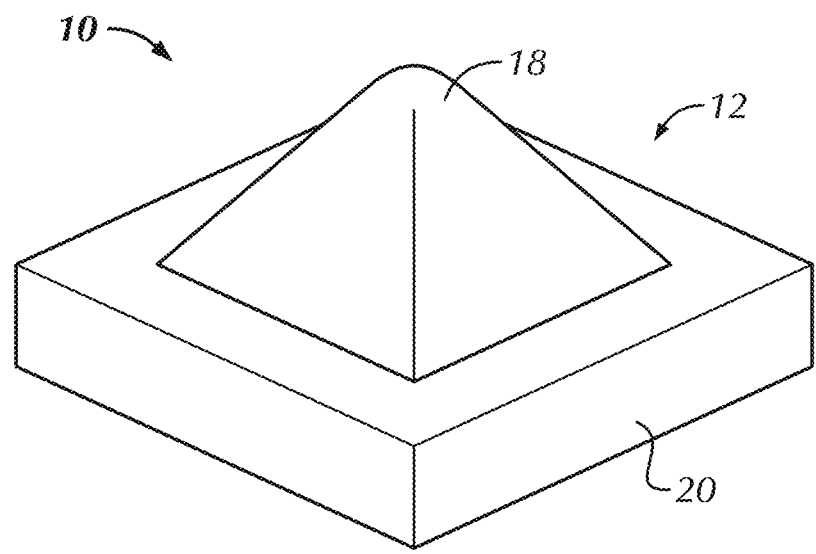
FIG. 1 is a perspective view of a system including a sensor, camera and computer that can be used to determine force exerted by an object or the weight of an object.
Figure 1:
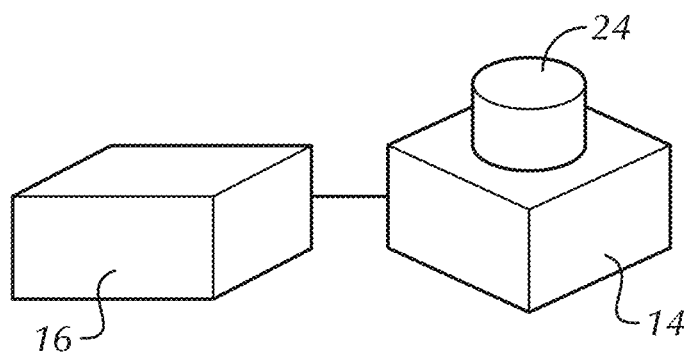
Figure 2:
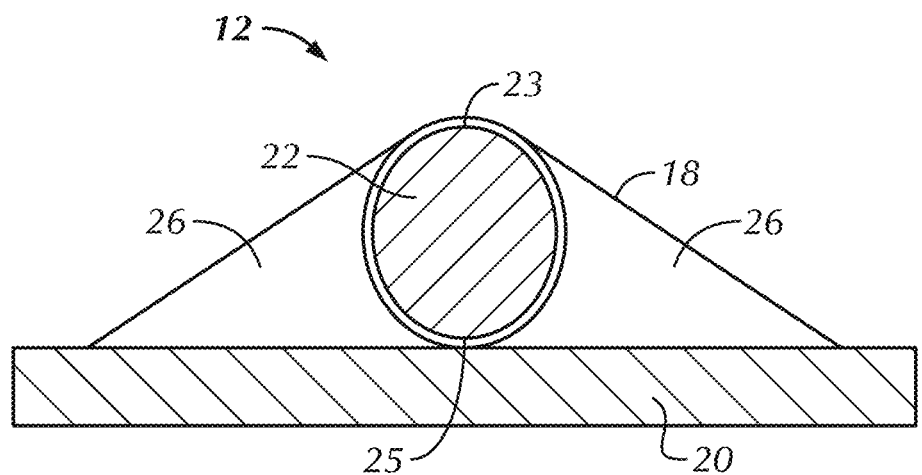
FIG. 2 is a side cross-sectional view of the sensor shown in FIG. 1.
Figure 13:
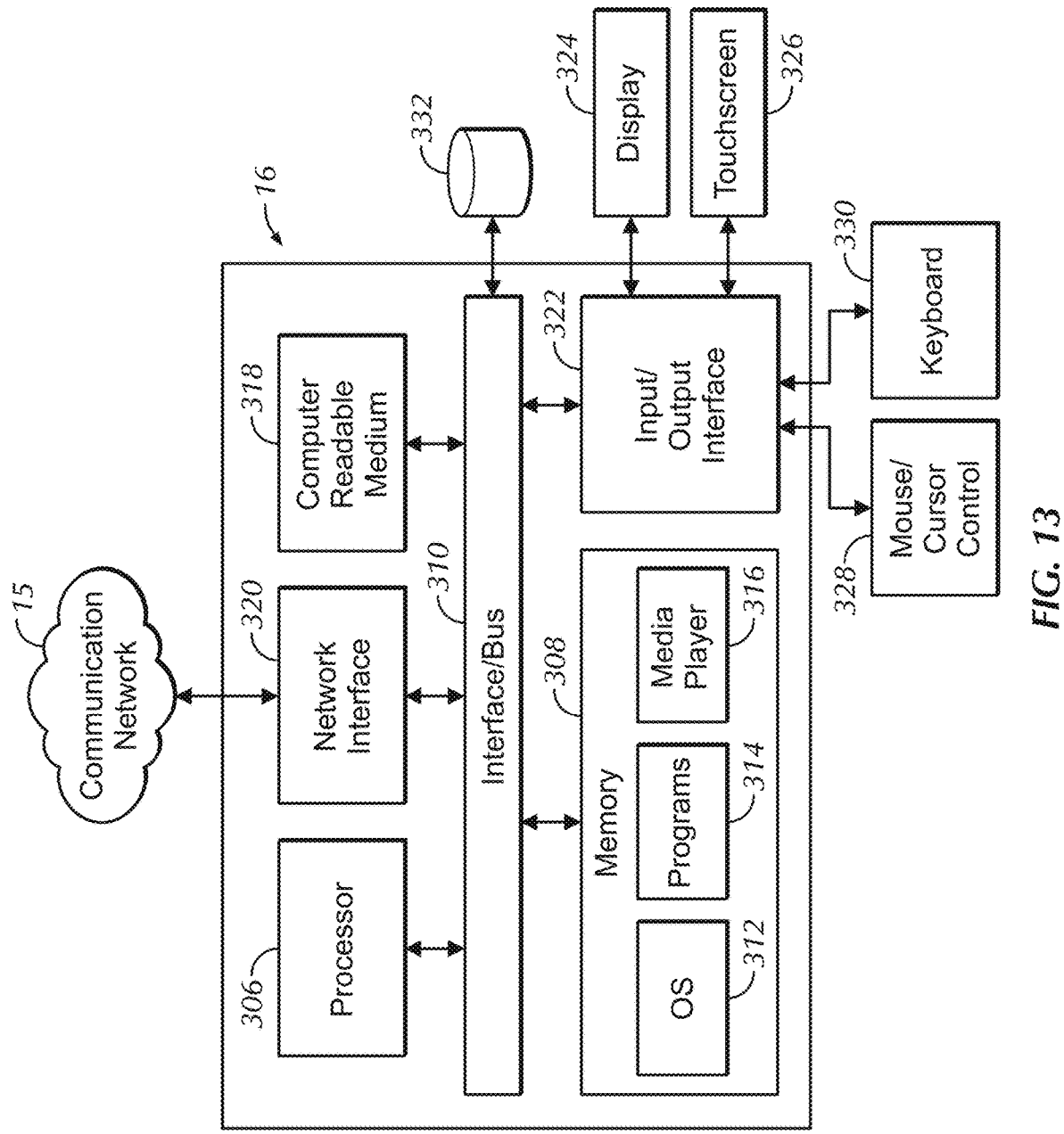
FIG. 13 is a schematic representation of a computer that may be used to implement all or part of the present inventions.

Referring to the drawings in detail, wherein like numerals denote identical elements throughout the several views, and referring initially to FIG. 1, there is shown a perspective view of a specific embodiment of a system 10 for determining force exerted by and/or weight of an object that may include a sensor 12, a camera 14 and a computer 16. In a specific embodiment, the sensor 12 may include a flexible sheet of material 18 (e.g., a latex sheet) affixed to a rigid clear plate 20 (e.g., a sheet of glass or plexiglass). As shown in FIG. 2, which is a cross-sectional view of the sensor 12 shown in FIG. 1, the sensor 12 may include a fluid filled bladder 22 disposed between the flexible sheet 18 and the clear plate 20. As shown in FIG. 1, the camera 14 may be disposed beneath the clear plate 20 and include a camera lens 24 aimed upwardly toward the clear plate 20. In a specific embodiment, the camera 14 may be connected to the computer 16. The general structure and operation of an example of the computer 16 is shown in FIG. 13 and described below.

When an object pushes on the flexible sheet 18, the fluid filled bladder 22 is squeezed, or depressed and deformed. The camera 14 views the bladder 22 through the clear plate 20 and sends images of the bladder 22 to the computer 16. The computer 16 analyzes the shape of the squeezed or deformed bladder 22 and calculates the amount of force with which the object is pushing against the flexible sheet 18. The system 10 repeats this with each image from the camera 14 in an iterative manner, supplying continuous measurements of the forces acting on the flexible sheet 18.

With reference to FIGS. 1 and 2, the flexible sheet of material 18 is sufficiently flexible to allow the sheet 18 and the top of the bladder 22 under it to move in all three axes. In FIG. 1, where the flexible sheet 18 is attached to the plate 20, the sheet 18 is shown as a square-based pyramid. However, other geometries are included within the scope of the present inventions. For example, in a specific embodiment, the base where the sheet 18 is affixed to the clear plate 20 (shown as a square shape in FIG. 1) may be in the shape of a circle, in which case the sheet 18 may form a cone as opposed to a pyramid as shown in FIG. 1. Other geometries encompassed by the present inventions may include the base being in the shape of a hexagon, an octagon, an oval, or any generally round shape. In a specific embodiment, the sheet 18 is not required and may be omitted if the north pole 23 of the bladder 22 (see FIG. 2) is permanently connected to an object being measured and the color of the object that is visible to the camera 14 is a contrasting color to the color of the bladder 22.

As mentioned above, the fluid filled bladder 22 is shown in FIG. 2. In a specific embodiment, the bladder 22 may be an elastic spheroid. The bladder 22 is not visible in FIG. 1, because the bladder 22 is between the flexible sheet 18 and the clear plate 20. In a specific embodiment, the bladder 22 may be connected to the flexible sheet 18 and the clear plate 20 at the north and south poles 23 and 25 of the bladder 22. In a specific embodiment, the preferred option for the bladder fluid is a non-compressible liquid (e.g., water). In another specific embodiment, the bladder fluid may be air. In a specific embodiment, the space 26 between the sheet 18, the plate 20, and surrounding the bladder 22 may also be filled with an internal fluid, such as air. In a specific embodiment, it is preferred that the internal fluid in the space 26 is at the same or higher pressure than the external fluid outside the sheet 18, otherwise the sheet 18 may fall around the bladder 22 and obscure the view of the camera 14. In a specific embodiment, the internal fluid in the space 26 may be maintained at a higher pressure than the pressure of the fluid inside the bladder 22 to ensure that the sheet 18 does not fold under the bladder 22. In a specific embodiment, the bladder 22 may be attached to the plate 20 so that the internal fluid surrounding the bladder 22 will not leak out (e.g., it may be airtight). In this manner, the internal fluid pressure will always be higher than the external fluid pressure outside of the sheet 18 and plate 20. In a specific embodiment, the sheet 18 and the bladder 22 will preferably have a sufficiently high visual contrast allowing the computer 16 to recognize the bladder 22 from the sheet 18 based on the input from the camera 14. For example, in a specific embodiment, the bladder 22 may be white and contrasted against a black sheet 18. In another specific embodiment, a green bladder 22 may be contrasted against a red sheet 18.

Referring to FIG. 1, in a specific embodiment, the camera lens 24 may be positioned in generally parallel relationship to the clear plate 20. The camera 14 will need light (e.g., ambient light) to see the bladder 22 and the sheet 18. The light must show the part of bladder 22 visible to the camera 14. In a specific embodiment, it is preferred that the light not create glare visible to the camera 14. In a specific embodiment, the light will show the part of the sheet 18 visible to the camera 14, unless the sheet 18 is black and the bladder 22 is white.

With reference to FIG. 1, the computer 16 is electrically connected to the camera 14. The connection is not limited to wire, for example Bluetooth or WiFi may be used. In a specific embodiment, the computer 16 may include a program adapted to calculate the amount and direction of the force on the bladder 22. A specific embodiment of a method that may be implemented by the computer 16 is illustrated in FIG. 3.

Figure 3:
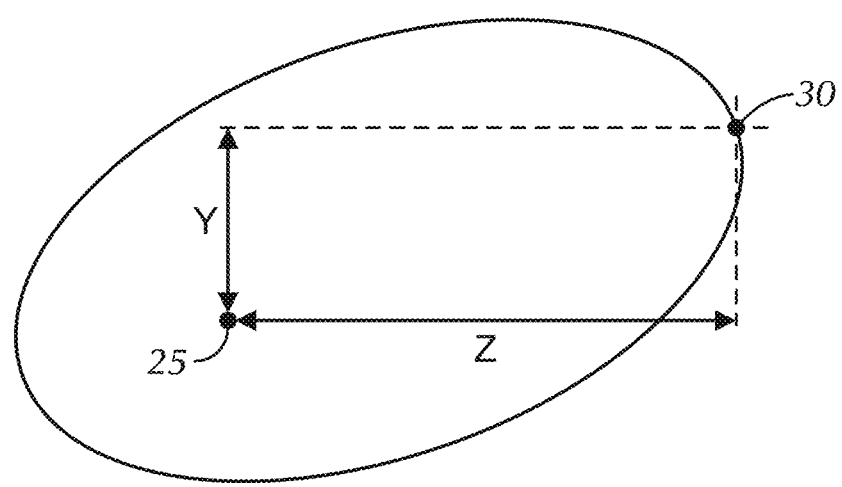
FIG. 3 is a schematic illustrating a specific embodiment of one aspect of the present inventions.

Referring now to FIG. 3, which shows the equator of the bladder 22 as seen from the camera lens 24, in a specific embodiment, to determine the edge of the bladder 22 from the camera image, each x,y point in the image may be examined and a Sorbel or similar program may be used to determine if this point is an edge point. To determine the farthest point 30 from the south pole 25: Calculate the distance from the south pole (px, py) to each edge point (ex, ey) using the distance formula which is square root (of the distance between the x points (px−ex) squared plus the distance between the y points (py−ey) squared). And keep the x, and y values of the largest distance as fx,fy. The x distance is the difference between the south pole px and the farthest x value fx. The y distance is the difference between the south pole py and the farthest y value fy. The area is the number of points within the equator. To get the force in the x direction lookup the x distance in a table which shows the force associated with each x value. To get the force in the y direction lookup the y distance in a table which shows the force associated with each y value. To get the force pushing down on the bladder (the z direction) lookup the area in a table which shows the force associated with each area value. The distance X is proportional to the force in the X direction. The distance Y is proportional to the force in the Y direction. The area within the equator is proportional to the Z direction, the force pushing the bladder down.

Figure 4:
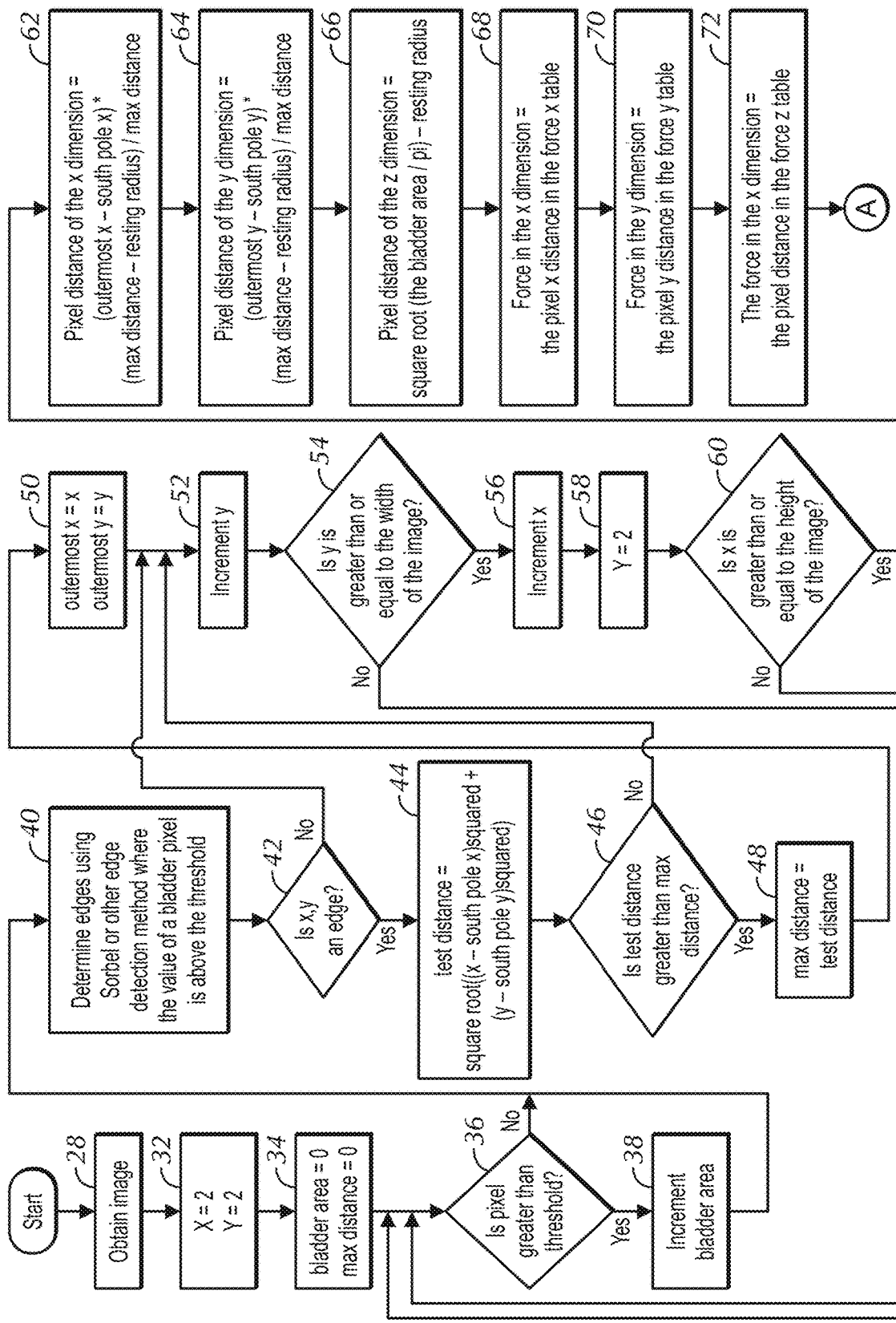
FIG. 4 is a flow chart illustrating a specific embodiment of a method in accordance with one aspect of the present inventions.

With reference to FIG. 4, a flow chart is provided to illustrate a specific embodiment of a process flow for using a sensor in accordance with the present inventions, such as explained above in connection with FIG. 3. At step 28, an image that is the output of the camera 14 is obtained. At step 32, the starting point for the x and y coordinates for a pixel is set to a pre-set number, such as X=2 and Y=2. The method will go through each pixel and determine if it is on the edge of the bladder, and if so, determine whether it is the farthest from the south pole 25. At step 34, the bladder area and max distance are two variable that are initialized by setting them to zero. The repetitive process of analyzing each pixel according to the flow chart of FIG. 3 will count up the total number of pixels within the bladder 22 and that will equal the bladder area. The max distance will be determined by finding the edges of the bladder and then determine which pixel on the edge of the bladder is the farthest from the south pole 25. At step 36, the process determines whether the pixel is greater than the threshold. If yes, then at step 38 the process with increment the bladder area. If no, then the process will go to step 40 to determine edges using Sorbel or other edge detection method where the value of the bladder pixel is above the threshold. Next, at step 42, the process determines whether the pixel (x, y) is an edge. If no, then the process moves to step 52, as will be described below. If yes, then at step 44 the process uses the formula shown to determine if the pixel is the farthest from the south pole 25. Next, at step 46, the process determines if the test distance is greater than max distance. If no, then the process moves to step 52, discussed below. If yes, then the process sets the max distance equal to the test distance. Next, the process moves to step 50, where the outermost x is set to the x value for the pixel being analyzed, and the outermost y is set to the y value for said pixel. Next, at step 52, the process increments y. Next, at step 54, the process determines if y is greater than or equal to the width of the image. If no, then the process goes back to step 36. If yes, then the process goes to step 56, to increment x. At step 58, y is set to 2. Next, at step 60, the process determines if x is greater than or equal to the height of the image. If no, then the process goes back to step 36. If yes, then the process goes to step 62, where the process sets the pixel distance for the x dimension according the formula shown there. Next, at step 62, the process sets the pixel distance for the y dimension according to the formula shown there. Next, at step 64, the process sets the pixel distance of the z dimension according to the formula shown there. Next, at step 68, the process sets the force in the x dimension equal to the pixel x distance in a force x table, which would be an input before the process begins. Next, at step 70, the process sets the force in the y dimension equal to the pixel y distance in a force y table, which would be an input before the process begins. Next, at step 72, the process sets the force in the x dimension equal to the pixel x distance in a force z table, which would be an input before the process begins. The force table is referred to as a force list below.

By way of further explanation of what is being shown in FIG. 4, the image is a two-dimensional matrix of pixels. The size of the matrix is dependent on the camera. Each pixel is a number. The pixel number for the color of the bladder will be significantly different than the pixel number for the color of the sheet. This difference is the result of the contrasting colors. Values of the pixel number above a chosen boundary number are bladder pixels. Values beneath are sheet pixels. Depending on the camera and the colors chosen, the pixel number directly from the camera may need to be changed to provide a range from the maximum of bladder color to the minimum of the sheet color.

A location is the x and y coordinates of a pixel. Pixel distance is the number of pixels between two locations. Distance between two pixels equals the square root of the sum of the differences of the x values of the locations squared plus the differences of the y values of the locations squared (Formula 1). The distance of a side of a second triangle equals distance of the same side of the first triangle times the hypotenuse of the second triangle divided by the hypotenuse of the first triangle (Formula 2). The radius equals the square root of the division of the area of the bladder by pi (Formula 3).

The flowchart requires four pieces of information which are constant and are determined before running the flowchart: (1) the location of the south pole of the bladder; (2) the radius of the bladder when no force is acting upon the bladder; (3) a frame around the bladder; and (4) a force list for each dimension.

The frame outlines the maximum size of the bladder. The frame limits the search and allows multiple bladders in the same image. For the flowchart, the frame is the sides of the image.

A force list converts the pixel distances into force units. A force list has the value of the amount of force felt at every pixel distance. Each dimension has its own force list. However, a 3-dimensional table can be used instead. A 3-dimensional table would give greater precision. Note that half of the pixel distances are negative, representing force in the opposite direction. Also note that since there are a limited number of pixels, the number of pixels distances is also limited.

In a specific embodiment, the x, y, and z component of the force in pixel units may be calculated as follows. The outermost location is the location of the pixel with the greatest pixel distance (Formula 1) from the south pole to the edge of the bladder. The greatest pixel distance is the hypotenuse of the first triangle. The greatest pixel distance less the radius of the bladder when no force is acting on it, is the hypotenuse of the second triangle. Using the difference between the x values of the south pole location and the outermost location as the pixel distance of the side of the first triangle and using formula 2, gives the x component of the lateral force. Using the difference between y values of the south pole location and the outermost location as the pixel distance of the side of the first triangle and using formula 2, gives the y component of the lateral force. These two component pixel distances are proportional to the amount of lateral force on the bladder.

The area of the bladder is the number of bladder pixels on the image. The pixel distance of the radius of the bladder area (Formula 3) less the radius of the bladder when no force is acting on it, gives the z component of the force on the bladder. This pixel distance is proportional to the amount of downward force on the bladder. A simpler and more precise method uses the difference of the area of the bladder minus the area of the bladder when no force is acting upon it.

The flowchart uses the Sorbel method of edge detection. This and other edge detectors are available in standard graphic packages such as OpenCV. These edge detectors use a large amount of computer power. The even lighting and high contrast of the image should allow much simpler methods. At the extreme, only testing adjacent pixels if they are above and below the threshold may work.

A further overview of the flowchart at FIG. 4 will now be provided. The camera supplies an image. Each column of the image within the frame is checked pixel by pixel from top to bottom and the bladder pixels are counted. When the pixels change from being sheet pixels to bladder pixels or vise versa, an edge is found. The pixel distance from the location of the edge to the location of the south pole is calculated. The location of the edge with the greatest pixel distance is the outermost location.

The components of the force, in pixel distances, are calculated from outermost location and the bladder area as previously described.

Each pixel distance is looked up in its force list giving the amount of force in that dimension. Return to the top. The process is repeated giving continuous measurements of the forces.

In a specific embodiment, the sample rate of the system 10 may be determined by the frame rate of the camera 14. A fast frame rate allows measuring vibrations. This allows detection of unusual vibrations or mechanical resonance.

Besides contrasting color between the bladder 22 and the sheet 18, films which reflect light differently between the bladder 22 and the sheet 18 to allow detection of the edge of the bladder may be used. Additionally, in a specific embodiment, visible light may be replaced with any source that produces waves that reflect differently on the surfaces of the bladder and the sheet. In a specific embodiment, this may include but not be limited to electromagnetic radiation outside the visible range and sound waves such as those used in sonar and sauna-grams. In these embodiments, the internal medium should be able to carry a wave and be transparent to the wave. In a specific embodiment, a distance-measuring device such as time-of-flight camera or LiDAR may be used since the distance to the bladder 22 will be less than the distance to the flexible sheet 18 thereby the edge of the bladder 22 may be detected by the abrupt change in distance.

In a specific embodiment, the flexible sheet 18 may include multiple layers. For example, in a specific embodiment, the sheet 18 may include an outer layer to provide protection from a hazardous environment, and an inner sheet to provide the preferred background color for contrast.

The system 10 can be used where pressure is measured. Unlike most pressure gauges, which measure pressure in one dimension, the systems of the present inventions may measure pressure in all three dimensions. A two-dimensional matrix of sensors can provide a pressure image similar to a pixel image from a camera. Such a matrix can be used in robots to provide a sense of touch.

In a specific embodiment, the system 10 may be used to determine the temperature of an object. In a specific embodiment, the bladder 22 may contain a temperature-sensitive fluid (e.g., mercury). A temperature-transferring material (e.g., copper) may be used to connect the north pole 23 of the bladder 22 to the flexible sheet 18, allowing the heat of the object touching the flexible sheet 18 to transfer to the fluid inside the bladder 22. On a robot finger, the finger may touch a surface to a specific pressure as determined by the area of the bladder, before any heat is transferred to the fluid. Then wait until the heat energy expands the bladder 22. When the expansion stops, the temperature of the object can be determined. The difference of the final area of the bladder 22 minus the area of the bladder 22 when at the specific pressure is used to look up the temperature at that expansion. A table may be derived from recorded measurements at known temperatures.

The sensors 12 may be arranged in a two-dimensional matrix. Each bladder 22 may have a camera, or one camera may view multiple adjacent bladders. The plates may have gaps between them which would increase the area covered and decrease the expense but lower the resolution. The plates may be arranged in squares, hexagonal, or other shapes. The use of square and hexagonal plates may eliminate the need for gaps between the plates for a flat matrix. Hexagonal plates may allow more bladders per area then square plates. A mixture of hexagonal and pentagonal plates may allow the surface of the matrix to be curved, both concave and convex. A near sphere may be made with only pentagonal plates (e.g., a dodecahedron). Different bladders in a matrix may allow measurement of a larger pressure range and may include a temperature sensor.

The flexible sheet 18 does not need to be attached directly to the plate 20. In a specific embodiment, a salient issue is the bladders move independently of each other but are fixed over the camera(s). Other options include but are not limited to: rods, wire, strings or a plate with holes for each bladder. In a specific embodiment, these should be the same color as the flexible sheet where the cameras can see it.

In a specific embodiment, the camera 14 may be in one of five general positions. First, the camera 14 may be placed at a distance from the plate 20, viewing the bladder 22 with a telephoto or similar lens. This allows the camera 14 and computer 16 to be at a safe distance from hazardous materials, such as chemical, radioactive, or high and low heat. An example of this may be in a foundry with molten metal, with the camera 14 positioned a number of feet or farther away from the plate 20. Second, the camera 14 may be positioned closer to the plate 20 using a regular lens. Third, the camera 14 may be positioned still closer to the plate 20 using a fisheye lens 24. Fourth, the clear plate 20 and lens 24 may be combined by curving the top and/or the bottom forming a lens for the camera 14. Fifth, for the closest embodiment, the bladder 22 may sit on the lens 24 by using a compound lens.

In another specific embodiment, the present inventions may relate to sensors that may be used to determine the weight of an object. In a broad aspect, the present sensor inventions may be based on a simple observation: as a bladder is pressed down, its equator expands; and as it is pressed laterally, the bladder stretches. In a broad aspect, the present sensor inventions may be used to measure the change in the shape of the bladder to determine the force acting on the bladder.

Figure 5:
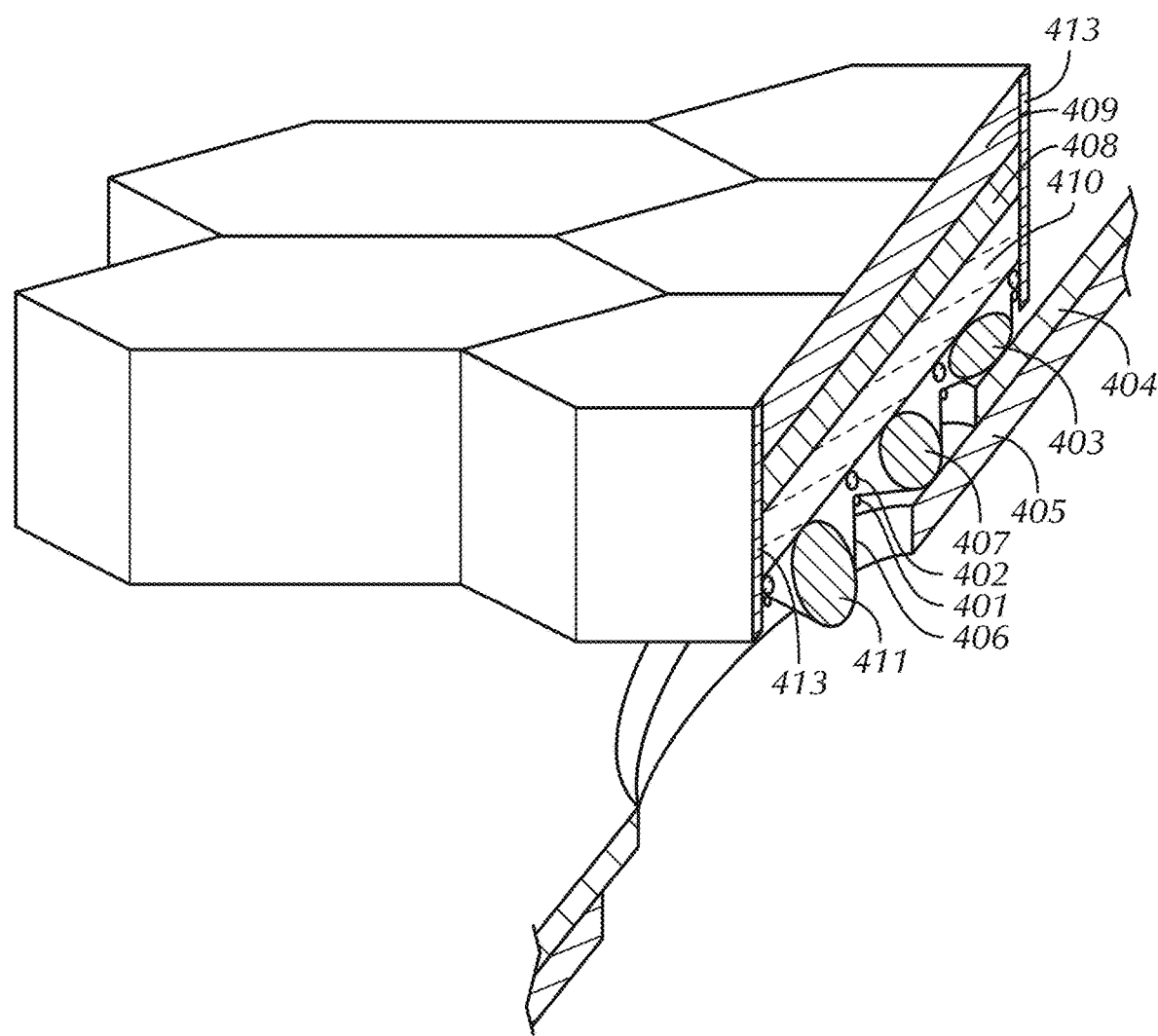
FIG. 5 is a cross-section perspective view taken along line 5-5 in FIG. 6 of a specific embodiment of a lens constructed in accordance with one aspect of the present inventions.
Figure 6:
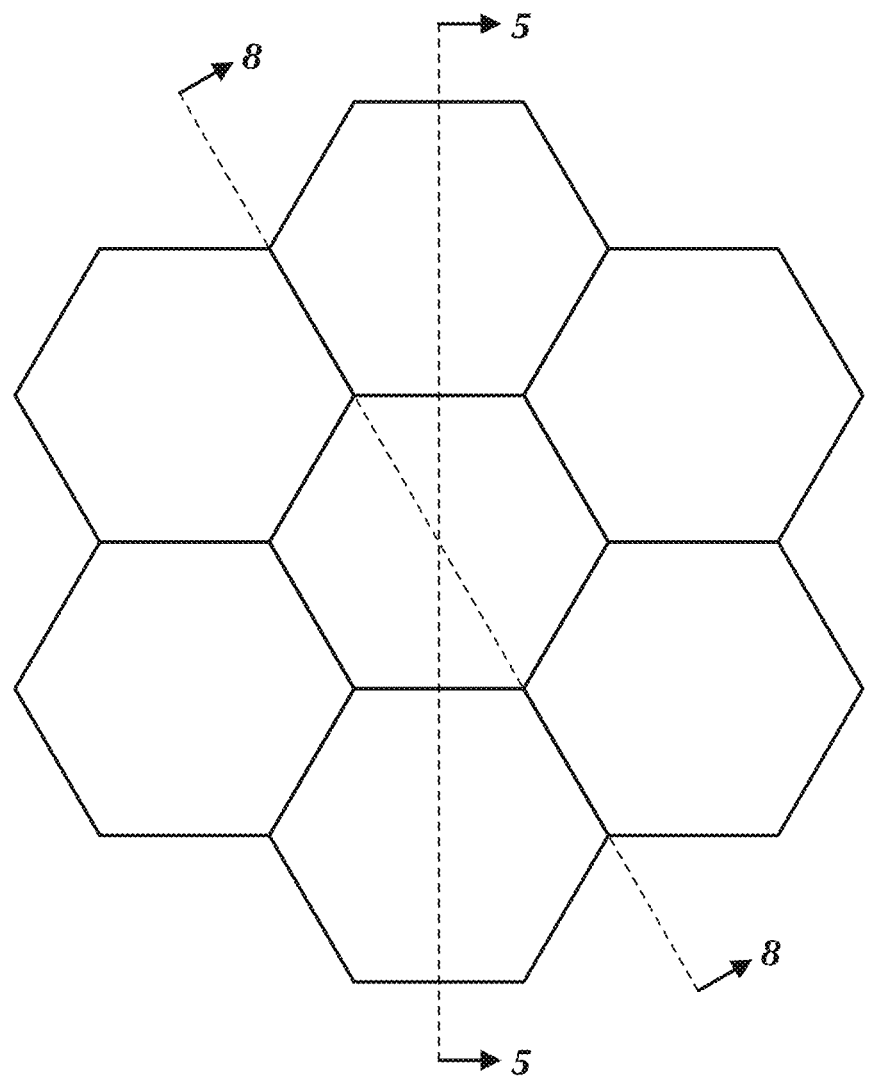
FIG. 6 is a top view of a specific embodiment of a sensor in accordance with one aspect of the present invention.
Figure 7:
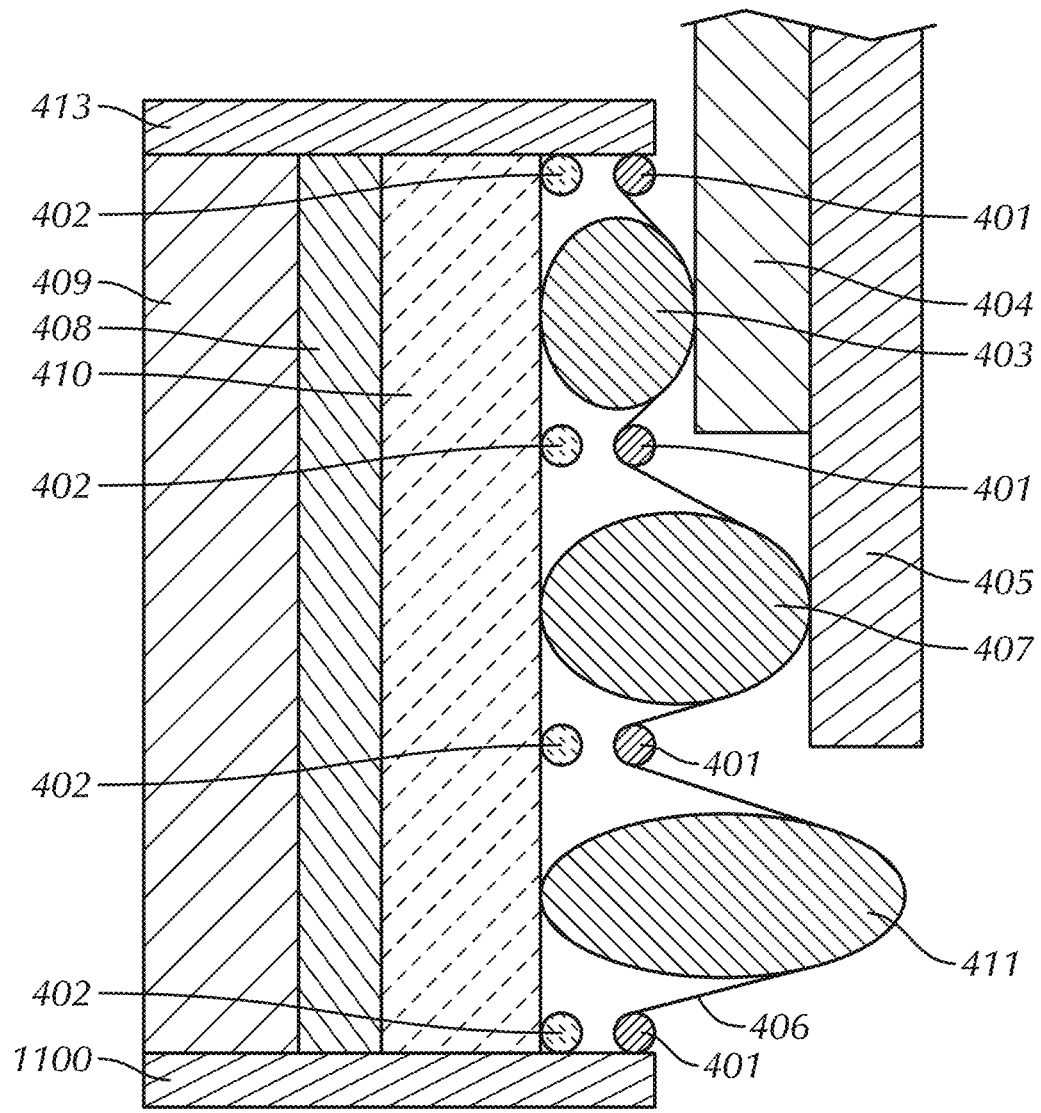
FIG. 7 is a cross-sectional view taken along lines 5-5 of FIG. 6.
Figure 8:
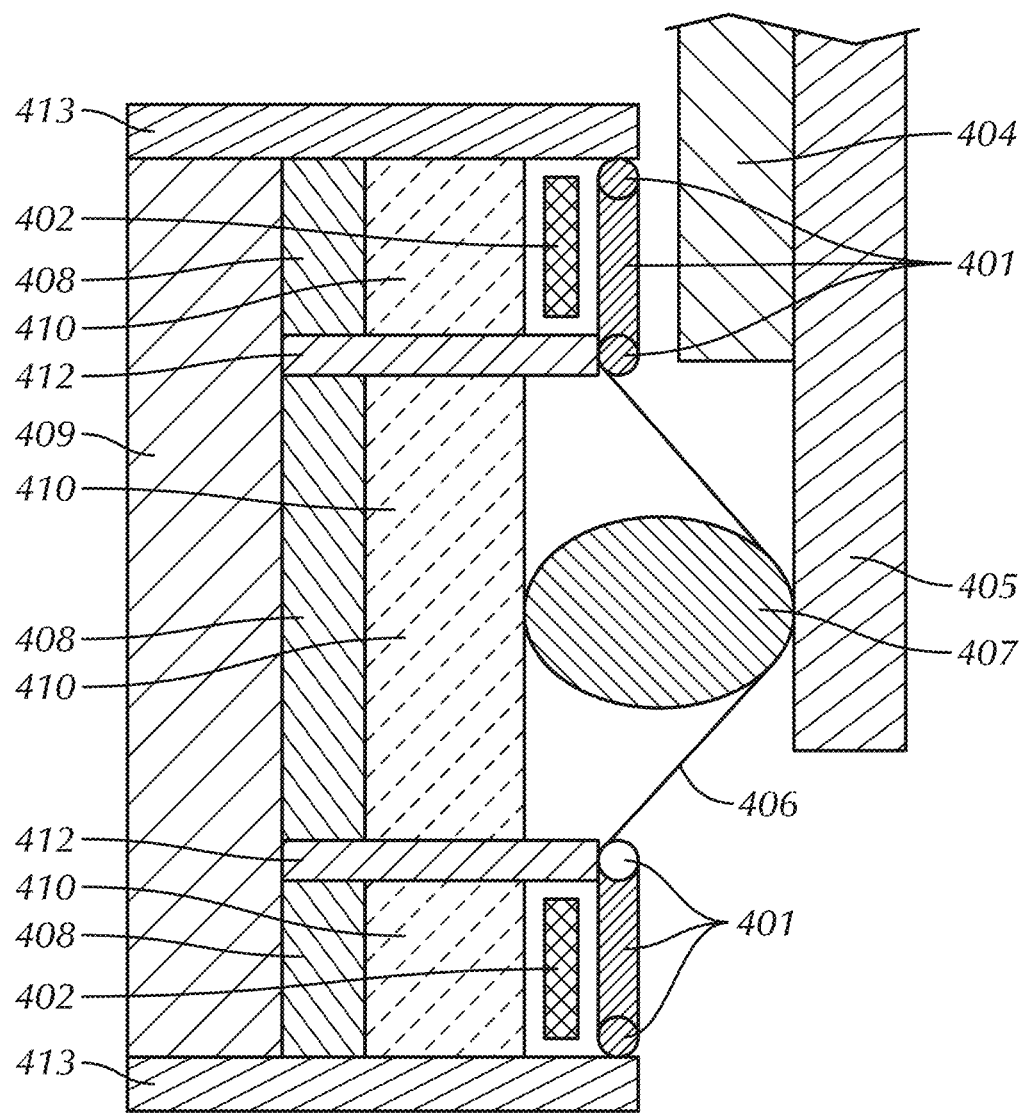
FIG. 8 is a cross-sectional view taken along lines 8-8 of FIG. 6.
Figure 9:
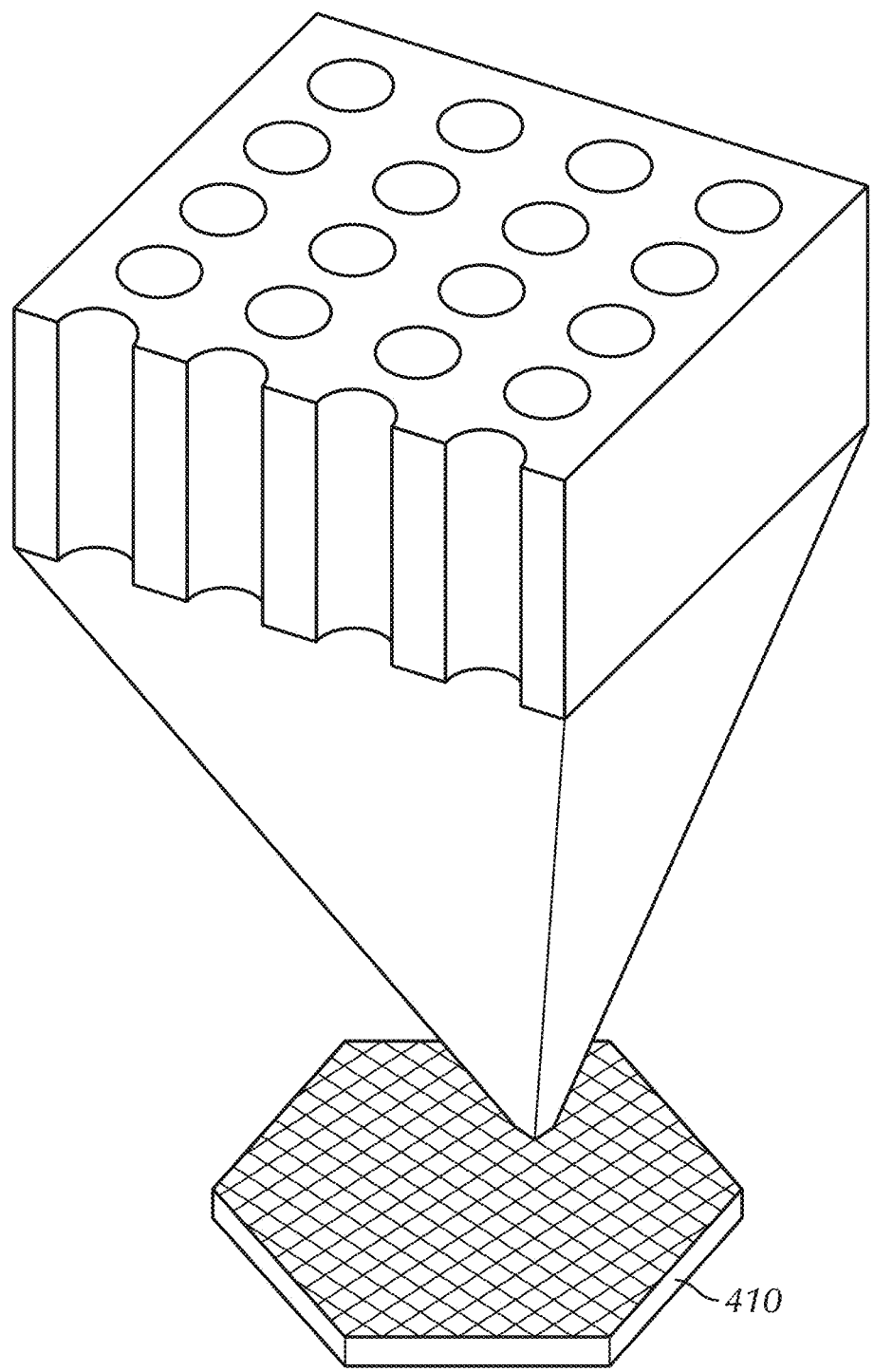
FIG. 9 is a view of the lens 410 in FIGS. 5, 7, and 8, and includes an exploded portion thereof showing details of the lens.
Figure 10:
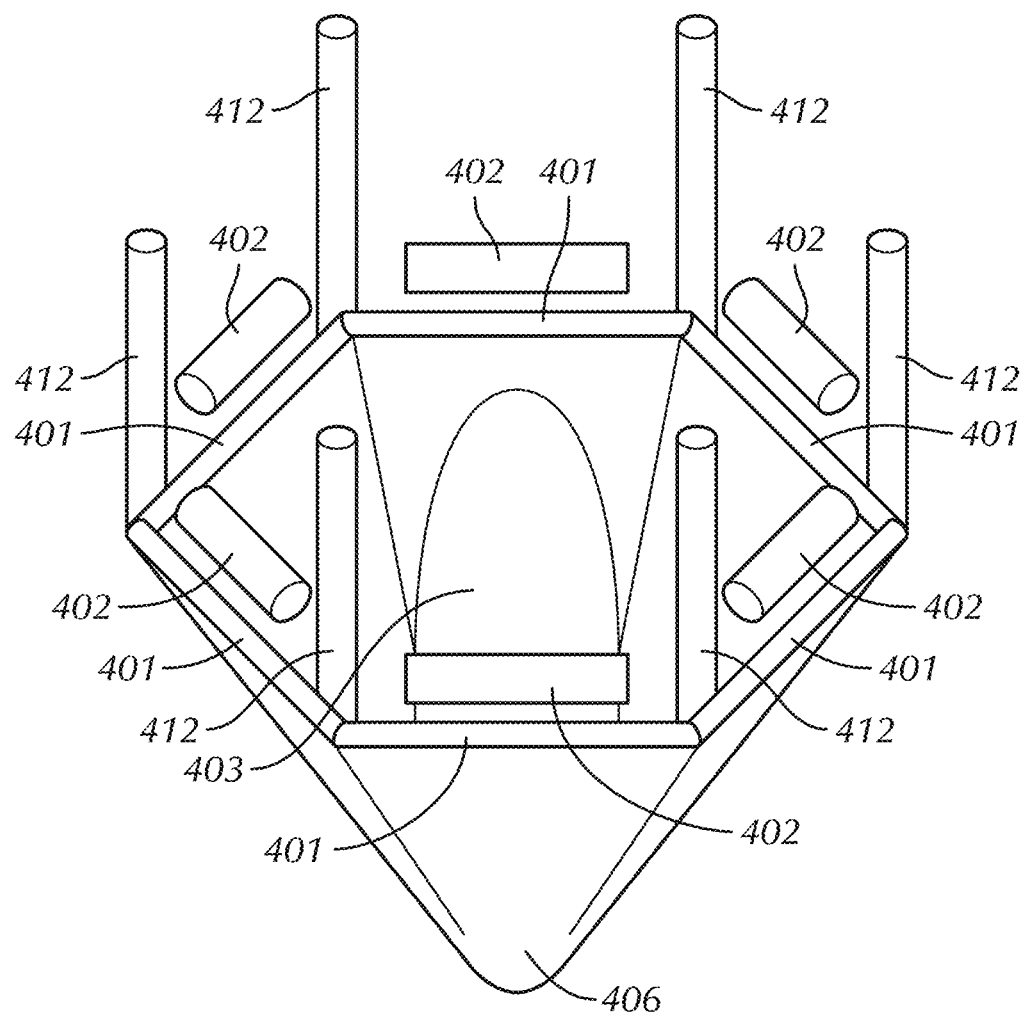
FIG. 10 is a schematic representation of a specific embodiment of a sensor in accordance with one aspect of the present inventions.
Figure 11:
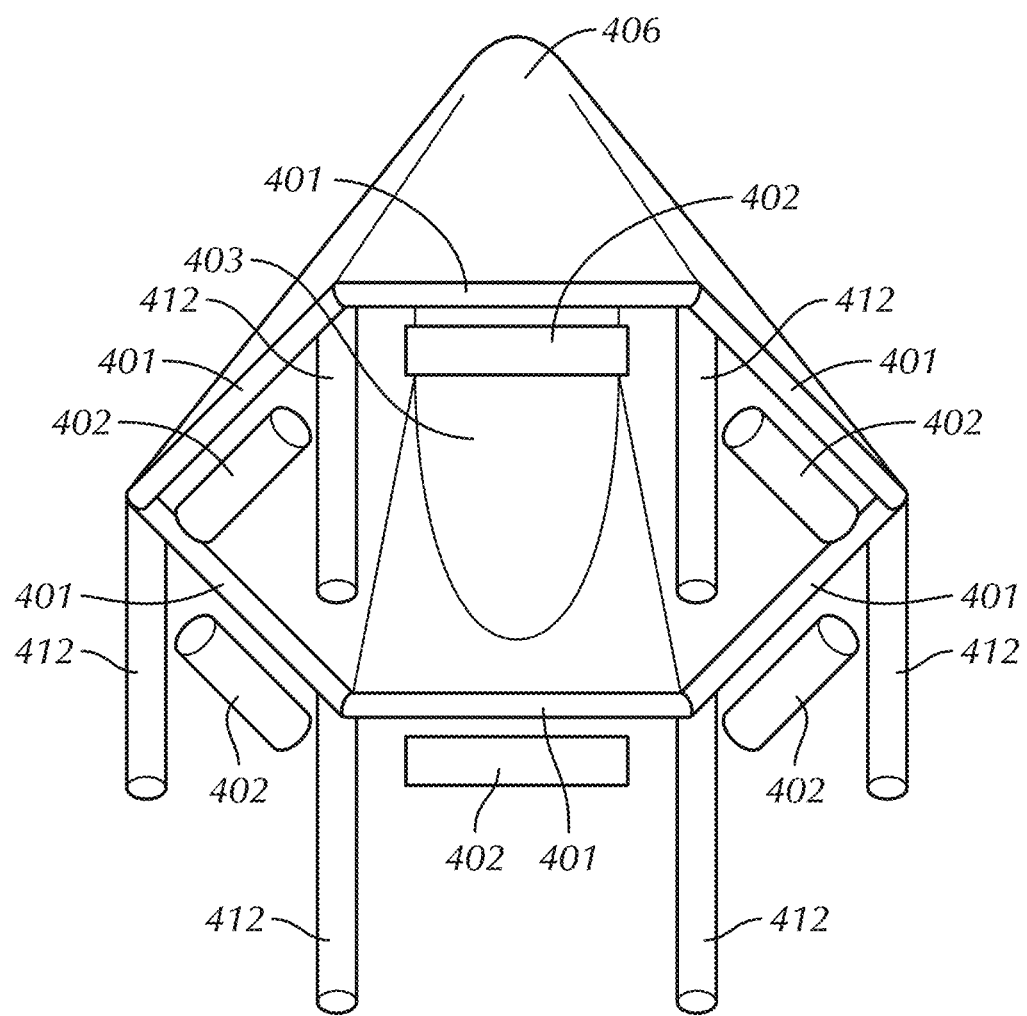
FIG. 11 is a schematic representation of a specific embodiment of a sensor in accordance with one aspect of the present inventions.
Figure 12:
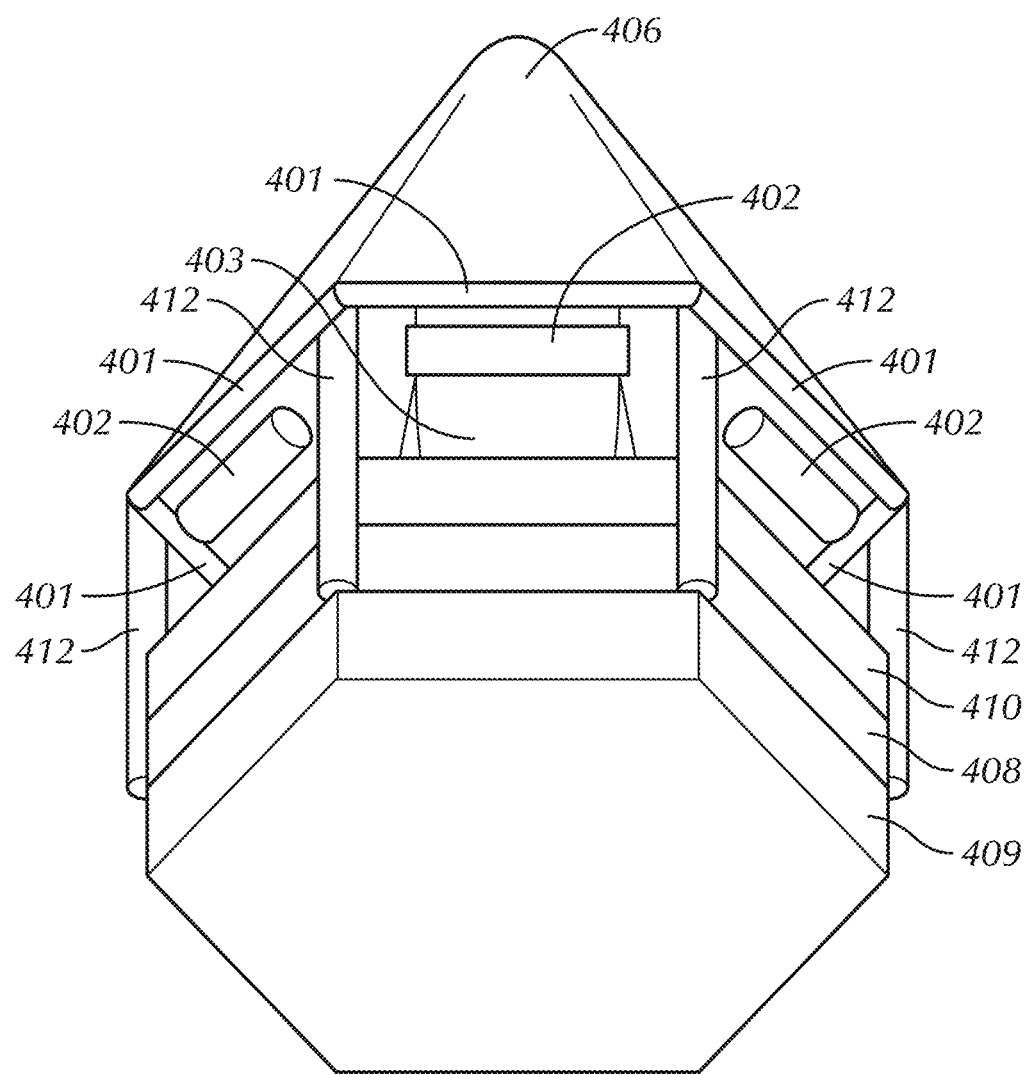
FIG. 12 is a schematic representation of a specific embodiment of a sensor in accordance with one aspect of the present inventions.

With reference to FIGS. 4-12 a specific embodiment of a sensor matrix is shown. This embodiment is an example of aligning holes in two sheets of metal. In the embodiment, the sensor matrix consists of seven hexagonal structures. FIGS. 5 and 6 show seven hexagonal structures arranged in a honeycomb matrix with one in the center surrounded by the other six. Each hexagon has a bladder in its center. FIG. 5 is a perspective cross section showing half of the sensor matrix. FIGS. 5 and 7 show cross sections through the center of the honeycomb matrix. In FIGS. 5 and 7, the cross section intersects three bladders 403, 407, and 411. In FIG. 8, the cross section intersects one bladder 407. FIGS. 10-12 show perspective views of just the center hexagonal structure. In FIG. 10 the support 409, camera 408, and lens 410 are removed to allow the interior of the center hexagonal structure to be seen. FIGS. 5 and 7 shows rod 401 and lens 410 performing the functions of the plate 20 in FIG. 2. FIGS. 5 and 7 shows that the rod 401 holds the edges of sheet 406 as plate 20 in FIG. 2 holds the edges of sheet 18. Lens 410 supports bladders 403, 407, and 411 as in FIG. 2, and plate 20 supports bladder 25. Lens 410 performs the functions of camera lens 24 in FIG. 1, but is not a traditional lens. Lens 410 is a compound lens. Lens 410 contains a grid of clear vertical tubes in an opaque light absorbing substance. The tubes may be air, glass, or other transparent materials. FIG. 9 shows the lens 410 and a magnified detail of the lens 410. The clear tubes in the lens 410 focus the light onto camera 408. Each tube only allows the light from a spot directly under it, in FIG. 5 or directly to the right of it in FIGS. 7 and 8, to reach the pixels of camera 408. If the bladder is directly under or to the right of the tube, the pixel of camera 408 sees the bladder, otherwise it sees the sheet 406. Camera 408 is a computer chip camera (e.g. CMOS). Camera 408 is on a support 409. FIGS. 10-12 show rods 401 are connected to the outside perimeter walls 413 of the sensor matrix. Additionally, as shown in FIGS. 10-12, the rods 401 are attached to the lens 410 by 6 supporting posts 412, one at each corner of the center hexagon. LEDs 402 provide light. Each bladder in the seven hexagons is attached to the lens 410 at their south poles. All the sheets are attached to the rods 401 and are attached to the north poles of each of the seven bladders. Not all sheets are labeled in FIGS. 5, 7, and 8. In FIGS. 5, 7, and 8, the sensor matrix is held parallel to surface 404. Bladder 403 is pushed by surface 404. Bladder 407 is pushed by surface 405. Bladder 411 is not pushed. The pressure on each bladder is different since the surfaces are at different heights. This causes the equator of bladder 403 to expand more than the equator of bladder 407 which is more than the equator of bladder 411. The sensor matrix calculates different pressures based upon the different sizes of the bladders' equators. In the example of aligning two holes, the different pressures show the location of the holes relative to the sensor matrix. When using, the sensor matrix would be moved around surface 404 until a hole is detected by the change in pressure when a bladder finds the hole. FIGS. 5, 7, and 8 show the sensor after detecting two holes. Once detected, the surfaces 404 and 405 are moved until the two holes align.

In another specific embodiment, a sensor matrix (as described above) on the tips of a robot finger (not shown) can be used to determine the amount of force needed to pick up an object. A robot hand (not shown) may grasp the object with a minimum of force. Then the robot hand may be raised slowly squeezing the object as the hand is raised until the downward force stops increasing. At that point the object is aloft and the increase in squeezing may stop. If the object slides down the fingers, the sensors would detect a change in pressure as irregularities pass over the bladders. As the edge of the object slides past the fingers, the pressure would drop to zero.

The present inventions can be used for a variety of purposes. For example, a sensor such as system 10 shown in FIG. 1 can be used as an accelerometer in planes or robots. In a robot this would act as an inner ear. On a plane this would be in a Black Box.

As another example, a sensor in accordance with the present invention could be used as a mouse on laptops, tablets, and smart phones. Lateral motions would move the mouse and pressing down would be a click.

Computer Architecture

The present inventions can be realized in hardware, software, or a combination of hardware and software. In a specific embodiment, a system according to the present inventions can be realized in a centralized fashion in one computer system, or in a distributed fashion where different elements are spread across several interconnected computer systems. Any kind of computer system or other apparatus adapted for carrying out the methods and inventions described herein may be used for purposes of the present inventions. A typical combination of hardware and software could be a general-purpose computer system with a computer program that, when being loaded and executed, controls the computer system such that it carries out the methods and inventions described herein.

The figures herein include block diagram and flowchart illustrations of methods, apparatus(s) and computer program products according to various embodiments of the present inventions. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus may be used to implement the functions specified in the block, blocks or flow charts. These computer program instructions may also be stored in a computer-readable medium or memory that can direct a computer or other programmable data processing apparatus to function in a particular manner, such that the instructions stored in the computer-readable medium or memory produce an article of manufacture including instructions which may implement the function specified in the block, blocks or flow charts. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block, blocks or flow charts.

Those skilled in the art should readily appreciate that programs defining the functions of the present inventions can be delivered to a computer in many forms, including but not limited to: (a) information permanently stored on non-writable storage media (e.g., read only memory devices within a computer such as ROM or CD-ROM disks readable by a computer I/O attachment); (b) information alterably stored on writable storage media (e.g., floppy disks and hard drives); or (c) information conveyed to a computer through communication media for example using wireless, baseband signaling or broadband signaling techniques, including carrier wave signaling techniques, such as over computer or telephone networks via a modem, or via any of the networks included within the systems discussed above.

Referring now to FIG. 13, a diagram is shown illustrating an example of a computer 14 that may be used in connection with the present inventions. The computer 16 may include at least one processor 306 and at least one memory 308, each of which may be coupled to a local interface or bus 310.

An operating system 312 may be stored in the memory 308 and executable by the processor 306. Any variety of software programs 314 may also be stored in the memory 308 and executable by the processor 306. In a specific embodiment, examples of programs that may be stored in the memory 308 and executable by the processor 306 may include one or more programs that may implement the functionality described herein above in connection with FIGS. 1-4. A media player application 316 may be stored in the memory 308 and executable by the processor 306. Also stored in the memory 306 may be various forms of data.

The term "executable" as used herein means that a program file is of the type that may be run by the processor 306. In specific embodiments, examples of executable programs may include without limitation: a compiled program that can be translated into machine code in a format that can be loaded into a random access portion of the memory 308 and run by the processor 306; source code that may be expressed in proper format such as object code that is capable of being loaded into a random access portion of the memory 308 and executed by the processor 306; or source code that may be interpreted by another executable program to generate instructions in a random access portion of the memory 308 to be executed by the processor 306. An executable program may be stored in any portion or component of the memory 308 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 308 may include both volatile and nonvolatile memory and data storage components. Volatile components are those that do not retain data values upon loss of power. Nonvolatile components are those that retain data upon a loss of power. Thus, the memory 308 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In a specific embodiment, the processor 306 may represent multiple processors 306 and/or multiple processor cores and the memory 308 may represent multiple memories 306 that operate in parallel processing circuits, respectively. In such a case, the local interface 310 may be an appropriate network that facilitates communication between any two of the multiple processors 306, between any processor 306 and any of the memories 308, or between any two of the memories 308, etc. The local interface 310 may comprise additional systems designed to coordinate this communication, including, for example, performing load balancing. The processor 306 may be of electrical or of some other available construction.

Although the programs and other various systems, components and functionalities described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components. Such technologies are generally well known by those skilled in the art and, consequently, are not described in detail herein.

The flowcharts and algorithms within FIGS. 3-4, and as further described elsewhere in the specification, show the functionality and operation of various specific embodiments of certain aspects of the present inventions. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 306 in a computer system or other system. The machine code may be converted from the source code, etc. If embodied in hardware, each block may represent a circuit or a number of interconnected circuits to implement the specified logical function(s).

Although the flowcharts within FIGS. 3-4 may show a specific order of execution, it is understood that the order of execution may differ from that which is depicted. For example, the order of execution of two or more blocks may be scrambled relative to the order shown. Also, two or more blocks shown in succession in the flow charts within FIGS. 3-4 may be executed concurrently or with partial concurrence. Further, in some embodiments, one or more of the blocks shown in FIGS. 3-4 may be skipped or omitted. In addition, any number of counters, state variables, warning semaphores, or messages might be added to the logical flow described herein, for purposes of enhanced utility, accounting, performance measurement, or providing troubleshooting aids. It is understood that all such variations are within the scope of the present inventions.

Any logic or application described herein that comprises software or code can be embodied in any non-transitory computer-readable medium, such as computer-readable medium 318 shown in FIG. 9, for use by or in connection with an instruction execution system such as, for example, a processor 306 in a computer system or other system. In this sense, the logic may comprise, for example, statements including instructions and declarations that can be fetched from the computer-readable medium 318 and executed by the instruction execution system. In the context of the present inventions, a "computer-readable medium" may include any medium that may contain, store, or maintain the logic or application described herein for use by or in connection with the instruction execution system.

The computer-readable medium 318 may comprise any one of many physical media such as, for example, magnetic, optical, or semiconductor media. More specific examples of a suitable computer-readable medium 318 would include, but are not limited to, magnetic tapes, magnetic floppy diskettes, magnetic hard drives, memory cards, solid-state drives, USB flash drives, or optical discs. Also, the computer-readable medium 318 may be a random access memory (RAM) including, for example, static random access memory (SRAM) and dynamic random access memory (DRAM), or magnetic random access memory (MRAM). In addition, the computer-readable medium 318 may be a read-only memory (ROM), a programmable read-only memory (PROM), an erasable programmable read-only memory (EPROM), an electrically erasable programmable read-only memory (EEPROM), or other type of memory device.

The computer 16 may further include a network interface 320 coupled to the bus 310 and in communication with a communication network 15. The network interface 320 may be configured to allow data to be exchanged between computer 16 and other devices attached to the communication network 15 or any other network or between nodes of any computer system or a system. The communication network 15 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, the network interface 320 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The computer 16 may also include an input/output interface 322 coupled to the bus 310 and also coupled to one or more input/output devices, such as a display 324, a touchscreen 326, a mouse or other cursor control device (e.g., television remote control) 328, and/or a keyboard 330. In certain specific embodiments, further examples of input/output devices may include one or more display terminals, keypads, touchpads, scanning devices, voice or optical recognition devices, or any other devices suitable for entering or accessing data by one or more computers 16. Multiple input/output devices may be present with respect to a computer 16 or may be distributed on various nodes of computer system, a system and/or any of the devices discussed above. In some embodiments, similar input/output devices may be separate from the computer 16 and may interact with the computer 16 or one or more nodes of computer system through a wired or wireless connection, such as through the network interface 320.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

The invention claimed is:

1. A system for measuring force comprising:
a sensor including a flexible sheet of material, a rigid clear plate, and a fluid filled bladder, the bladder having a north pole and a south pole, the flexible sheet of material being affixed to the rigid clear plate, the fluid filled bladder being attached to the flexible sheet of material at the north pole of the bladder, the fluid filled bladder being attached to the rigid clear plate at the south pole of the bladder, and the fluid filled bladder being disposed between the flexible sheet of material and the rigid clear plate; and
a camera disposed beneath the rigid clear plate and including a camera lens aimed upwardly toward the rigid clear plate.

2. The system of claim 1, further including a computer connected to the camera.

3. The system of claim 1, wherein the flexible sheet of material is a latex sheet.

4. The system of claim 1, wherein the rigid clear plate is a sheet of glass.

5. The system of claim 1, wherein the rigid clear plate is a sheet of plexiglass.

6. The system of claim 1, wherein the bladder is an elastic spheroid.

7. The system of claim 1, wherein the fluid in the bladder is a non-compressible liquid.

8. The system of claim 1, wherein the fluid in the bladder is air.

9. The system of claim 1, wherein a space between the flexible sheet of material, the rigid clear plate, and surrounding the bladder is filled with a fluid.

10. The system of claim 1, wherein the sheet and the bladder are constructed from materials having contrasting colors.

11. A system for measuring force comprising:
a sensor including a flexible sheet of material, a rigid clear plate, and a fluid filled bladder, the bladder having a north pole and a south pole, the flexible sheet of material being affixed to the rigid clear plate, the fluid filled bladder being attached to the flexible sheet of material at the north pole of the bladder, the fluid filled bladder being attached to the rigid clear plate at the south pole of the bladder, and the fluid filled bladder being disposed between the flexible sheet of material and the rigid clear plate, the sheet and the bladder being constructed from materials having contrasting colors, and the fluid in the bladder being one of a non-compressible liquid and air; and
a camera disposed beneath the rigid clear plate and including a camera lens aimed upwardly toward the rigid clear plate.

12. The system of claim 11, further including a computer connected to the camera.

13. The system of claim 11, wherein the flexible sheet of material is a latex sheet.

14. The system of claim 11, wherein the rigid clear plate is a sheet of glass.

15. The system of claim 11, wherein the rigid clear plate is a sheet of plexiglass.

16. The system of claim 11, wherein the bladder is an elastic spheroid.

17. A system for measuring force comprising:
a sensor including a flexible sheet of material, a rigid clear plate, and a fluid filled bladder, the bladder having a north pole and a south pole, the flexible sheet of material being affixed to the rigid clear plate, the fluid filled bladder being attached to the flexible sheet of material at the north pole of the bladder, the fluid filled bladder being attached to the rigid clear plate at the south pole of the bladder, and the fluid filled bladder being disposed between the flexible sheet of material and the rigid clear plate;
a camera disposed beneath the rigid clear plate and including a camera lens aimed upwardly toward the rigid clear plate; and
a computer connected to the camera.

18. The system of claim 17, wherein the fluid in the bladder is one of a non-compressible liquid and air.

19. The system of claim 17, wherein a space between the flexible sheet of material, the rigid clear plate, and surrounding the bladder is filled with a fluid.

20. The system of claim 17, wherein the sheet and the bladder are constructed from materials having contrasting colors.

\* \* \* \* \*